United States Patent
Klimek et al.

(10) Patent No.: US 8,668,250 B2
(45) Date of Patent: Mar. 11, 2014

(54) SIDE STRUCTURE OF A VEHICLE

(75) Inventors: Stanislaw Klimek, Frankfurt am Main (DE); Lothar Teske, Aschaffenburg (DE); Gunther Heim, Lampertheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 301 days.

(21) Appl. No.: 12/821,028

(22) Filed: Jun. 22, 2010

(65) Prior Publication Data

US 2010/0327630 A1 Dec. 30, 2010

(30) Foreign Application Priority Data

Jun. 25, 2009 (DE) .................. 10 2009 030 349

(51) Int. Cl.
*B60J 7/00* (2006.01)

(52) U.S. Cl.
USPC .................................................. 296/193.05

(58) Field of Classification Search
USPC .......... 296/193.05, 203.01, 29, 30, 204, 205, 296/187.12, 203.02, 209, 203.03, 187.05; 280/749, 729, 743.1, 730.2
See application file for complete search history.

(56) References Cited

U.S. PATENT DOCUMENTS

| | | | | |
|---|---|---|---|---|
| 4,252,364 A * | 2/1981 | Toyama et al. | .......... | 296/203.01 |
| 5,246,264 A * | 9/1993 | Yoshii | ....................... | 296/203.03 |
| 5,358,300 A * | 10/1994 | Gray | .............................. | 296/192 |
| 6,073,992 A * | 6/2000 | Yamauchi et al. | ....... | 296/203.01 |
| 6,102,472 A * | 8/2000 | Wallstrom | ............... | 296/203.01 |
| 6,139,094 A * | 10/2000 | Teply et al. | .............. | 296/203.03 |
| 6,217,109 B1 * | 4/2001 | Okana et al. | .............. | 296/203.03 |
| 6,293,618 B1 * | 9/2001 | Sukegawa et al. | ............ | 296/209 |
| 6,296,299 B1 * | 10/2001 | Hanakawa et al. | ....... | 296/187.03 |
| 6,412,857 B2 * | 7/2002 | Jaekel et al. | ................... | 296/205 |
| 6,485,089 B2 * | 11/2002 | Hanyu | ..................... | 296/203.01 |
| 6,623,067 B2 * | 9/2003 | Gabbianelli et al. | .......... | 296/205 |
| 6,648,404 B2 * | 11/2003 | Yakata et al. | ................. | 296/209 |
| 6,692,065 B2 * | 2/2004 | Yamamoto et al. | ........... | 296/205 |
| 6,702,368 B1 * | 3/2004 | Hanyu | ..................... | 296/193.06 |
| 6,709,045 B2 * | 3/2004 | Shuto et al. | .................... | 296/155 |

(Continued)

FOREIGN PATENT DOCUMENTS

DE 60103801 T2 7/2005
DE 102004053917 B3 4/2006

(Continued)

OTHER PUBLICATIONS

German Patent Office, German Search Report for Application No. 102009030349.9, dated Jan. 22, 2010.

*Primary Examiner* — Kiran B Patel

(74) *Attorney, Agent, or Firm* — Ingrassia Fisher & Lorenz, P.C.

(57) ABSTRACT

A side structure of a vehicle is provided with a side part outer frame. The side part outer frame includes, but is not limited to a front pillar and a center pillar with mounting connections for door hinges. The side part outer frame includes, but is not limited to the outer structure starting from a windshield to including a rear fender region and is a one-piece and stable construction and has a greater material thickness than a side part outer skin of a conventional side structure. One of the two pillars or both pillars comprise a reinforcement structure that is fixed within the side part outer frame.

9 Claims, 3 Drawing Sheets

(56) References Cited

U.S. PATENT DOCUMENTS

| | | | |
|---|---|---|---|
| 6,824,204 B2* | 11/2004 | Gabbianelli et al. | 296/205 |
| 7,032,958 B2* | 4/2006 | White et al. | 296/193.01 |
| 7,237,832 B2* | 7/2007 | Saeki | 296/193.06 |
| 7,331,626 B2* | 2/2008 | Yoshimoto et al. | 296/187.12 |
| 7,614,687 B2* | 11/2009 | Nakamura et al. | 296/193.06 |
| 7,914,068 B2* | 3/2011 | Mizohata | 296/193.06 |
| 2001/0030450 A1* | 10/2001 | Miyasaka | 296/204 |
| 2002/0048649 A1* | 4/2002 | Yamashita et al. | 428/131 |
| 2003/0230443 A1* | 12/2003 | Cramer et al. | 180/65.5 |
| 2004/0090087 A1* | 5/2004 | Kimura | 296/203.03 |
| 2005/0017543 A1* | 1/2005 | Riley et al. | 296/187.03 |
| 2005/0134084 A1* | 6/2005 | Rangnekar et al. | 296/146.11 |
| 2005/0189790 A1* | 9/2005 | Chernoff et al. | 296/193.05 |
| 2007/0267239 A1* | 11/2007 | Engels et al. | 180/281 |
| 2008/0203768 A1* | 8/2008 | Lowe | 296/205 |
| 2009/0218851 A1* | 9/2009 | Anderson et al. | 296/187.03 |
| 2011/0206890 A1* | 8/2011 | Belpaire et al. | 428/68 |
| 2011/0233970 A1* | 9/2011 | Nagai et al. | 296/203.03 |
| 2012/0104793 A1* | 5/2012 | Danielson et al. | 296/181.1 |
| 2012/0104799 A1* | 5/2012 | Danielson et al. | 296/193.06 |
| 2012/0104803 A1* | 5/2012 | Thomas et al. | 296/203.01 |

FOREIGN PATENT DOCUMENTS

| | | |
|---|---|---|
| DE | 102007037510 A1 | 2/2009 |
| JP | 6286651 A | 10/1994 |
| JP | 2001287666 A | 10/2001 |

\* cited by examiner

SIDE STRUCTURE OF A VEHICLE

CROSS-REFERENCE TO RELATED APPLICATION

This application claims priority to German Patent Application No. 102009030349.9, filed Jun. 25, 2009, which is incorporated herein by reference in its entirety.

TECHNICAL FIELD

The invention relates to a side structure of a vehicle with a side part outer frame. The side part outer frame comprises a front pillar and a center pillar with mounting connections for door hinges. The side part outer frame comprises the outer structure from a windshield to including a rear fender region and is a one-piece and stable construction.

BACKGROUND

From publication DE 10 2004 053 917 B3 a sidewall of a vehicle for this is known. This sidewall of the motor vehicle comprises a sill running in a lower region and a roof frame region, wherein between the sill and the roof frame region pillars extend, wherein the sill, the pillars and the roof frame region are produced in one piece from a suitably large sheet metal blank.

This one-piece sidewall produced from a sheet metal blank has no reinforcement elements whatsoever, but is rather produced from a locally hardenable steel alloy so that it is possible, by way of a hot forming process, to initially produce the sidewall and subsequently partially harden the regions of the sidewall that are subjected to high loads in the event of a possible crash of the vehicle.

This sidewall structure has the disadvantage that extremely expensive hardenable steel sheet material has to be used for the structure of the sidewall. In addition to this, not only a simple pressing process is required, but the crash-threatened region has to be additionally subjected to a thermal hardening process afterwards, during which disadvantageously problems of distortion and/or deformation of the side part can occur. FIG. 3 shows a further conventional side structure 3 which practically consists of a thin metal sheet which forms the side part outer skin 10 and is subsequently equipped with a plurality of locally reinforcing safety elements 22 to 35 for example for a passenger car for the U.S. market in order to satisfy corresponding safety regulations.

This plurality of safety structure elements 22 to 35 has the disadvantage of expensive stockholding and expensive assembly during the installation of the plurality of safety structure element 22 to 25 in the side part outer skin 10. It has however the advantage that the side part outer skin 10 has a smooth and continuous surface since it can be produced from a single, thin metal plate with front pillar 5, center pillar 6, door openings 15 and 16 as well as rear fender region 9, roof frame region 13 and floor sill 14. The disadvantage is that through the plurality of the safety structure elements 22 to 35 the weight of this side structure 3 of a vehicle because of today's higher safety requirement has meanwhile increased significantly so that new concepts of cost and weight saving have to be developed.

At least one object of the invention is to overcome the disadvantages in the prior art and state a side structure of a vehicle that gets by with conventional cost-effective sheet metal qualities yet prevents a plurality of safety structure elements and preferably has no overall weight increase and makes possible a significant increase of the efficiency during production. In addition, other objects, desirable features and characteristics will become apparent from the subsequent summary and detailed description, and the appended claims, taken in conjunction with the accompanying drawings and this background.

SUMMARY

According to an embodiment of the invention, a side structure of a vehicle is created with a side part outer frame. The side part outer frame comprises a front pillar and a center pillar with mounting connections for door hinges. The side part outer frame comprises the outer structure from a windshield to including a rear fender region and is of a one-piece and stable construction. The side part outer frame has a greater material thickness than a side part outer skin of a conventional side structure. One of the two pillars or both pillars have a reinforcement structure that is fixed within the side part outer frame.

This side structure has the advantage that conventional metal sheets, but of greater material thickness, are employed for the side part outer frame which replaces the thin side part outer skin that was usual to date, but has all moldings and structures of the previous one-piece thin side part outer skin. Through the greater material thickness compared with the conventional side part outer skin a majority of the plurality of the reinforcement structure elements can be omitted so that merely one or two additional reinforcement elements have to be provided. These reinforcement elements however can be produced of a thinner metal sheet than the conventional reinforcement elements since the side part outer frame already has a significantly greater material thickness and thus increased stability in the event of a crash. Thus the material thickness of such reinforcement elements can be reduced to a third and preferentially have the material thickness of the side part outer frame that is approximately 40 percent greater so that no additional materials for producing the new side structure of a vehicle have to be kept in stock. This, too, produces a significant cost saving and advantageously results in weight saving.

The one-piece side part outer frame preferentially comprises a material that is at least one third thicker than the side part outer skin of a conventional side structure in which additionally the plurality of locally reinforced safety structure elements are provided. Even a third increase of the material thickness for the new side part outer frame produces a clear increase in the crash resistance of the side structure. Merely in extremely critical locations such as on the center pillar or on the front pillar with windshield might additional reinforcement elements have to be installed so that the quantity of the parts to be joined of the new sidewall structure is reduced to two to three parts. The total weight of the one-piece side part outer frame with the additional reinforcement structure is less than the total weight of a conventional side structure with a plurality of locally reinforcing safety structure elements.

Instead of the metal reinforcement structure mentioned above it is also possible to produce a reinforcement structure of glass fiber composite material, having a plastic compound with a filling degree of 40% by volume to 90% by volume of fiber material, preferentially approximately 70% by volume to approximately 80% by volume of fiber material as fiber composite material. Such a material additionally yields further weight saving for the reinforcement structure and can be adapted to the inner wall of the center pillar as well as to the inner wall of the front pillar through suitable molding.

The fibers of this fiber composite material of the reinforcement structure can be glass fibers or carbon fibers. One advantage of carbon fibers is their tensile strength the other their weight advantage over glass fibers.

Furthermore, it is also an advantage to insert a structure element of an aluminum die casting alloy. A suitable aluminum alloy can also be used for the one-piece side part outer frame to make possible further weight saving. However, it must be considered that a sheet of a tough, elastic aluminum alloy with a high silicon content is a question of cost and can possibly cancel out the advantages of the storage costs as well as the production costs.

The side part outer frame according to an embodiment of the invention forms openings for the vehicle doors which can be hinged to the mounting connections of the front pillar and the center pillar by means of door hinges. To this end, the pillars and the rear fender region are arranged between a roof frame region and a floor sill of the one-piece side part outer frame so that the front door opening or driver's door opening is surrounded by a roof frame region of a front pillar, a floor sill and a center pillar, while the rear door opening is located between the center pillar, the roof frame region, the rear fender region and the floor sill.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
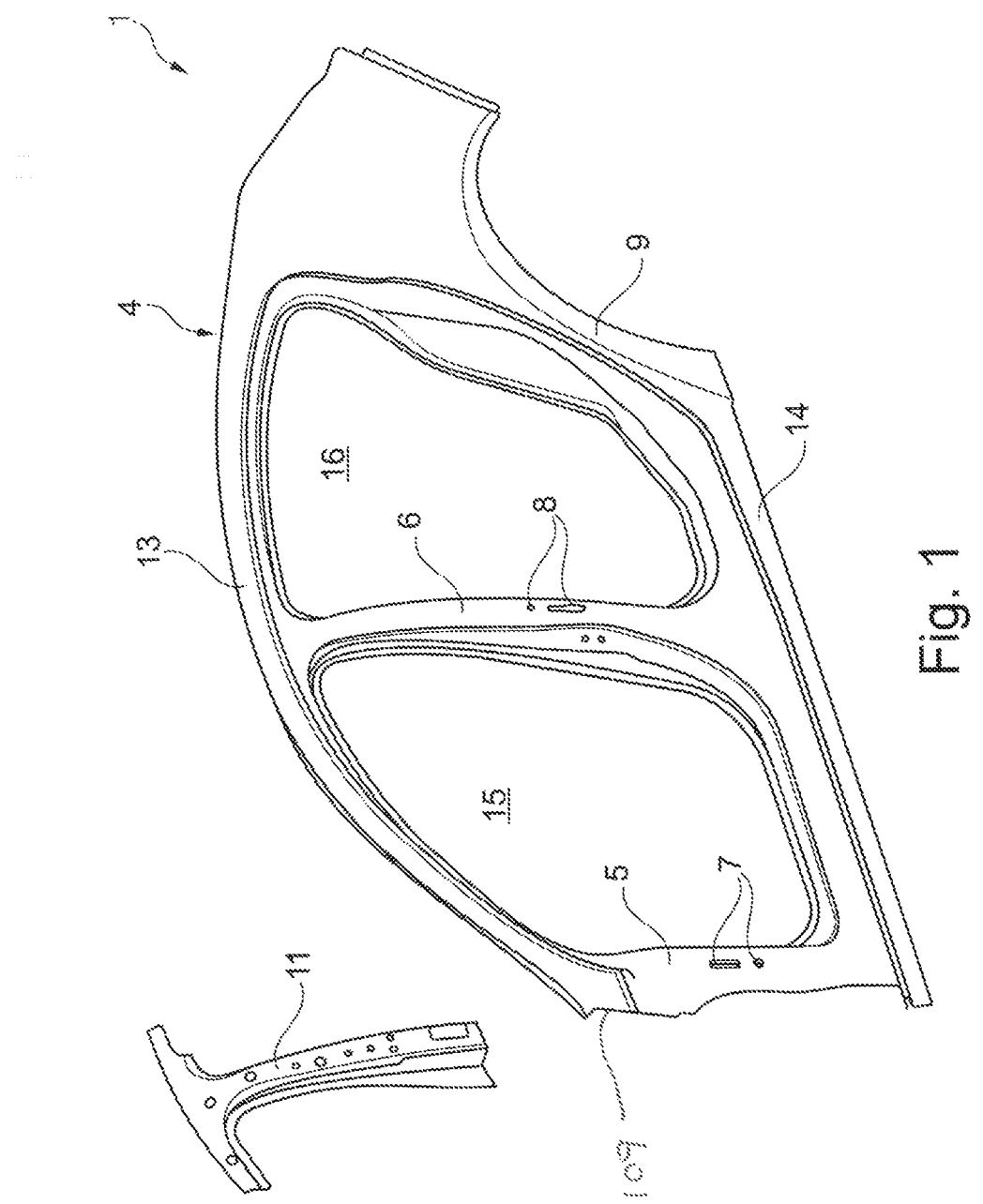
FIG. 1 shows a schematic representation of a side structure of a vehicle according to a first embodiment of the invention.
Figure 3:
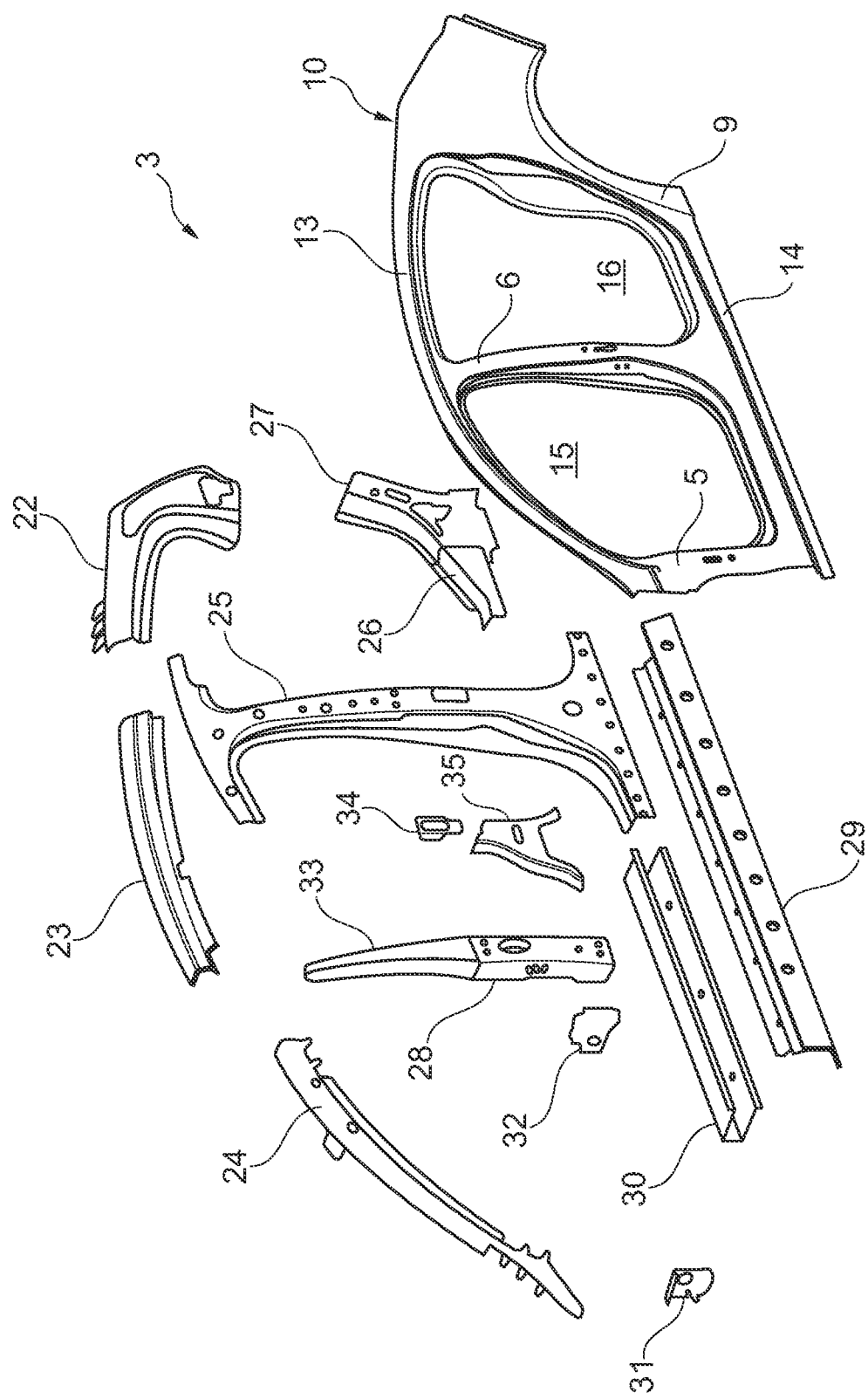
FIG. 3 shows a schematic representation of a side structure of a vehicle according to the prior art.

FIG. 1 shows a schematic representation of a side structure 1 of a vehicle according to a first embodiment of the invention. This side structure 1 substantially consists of two individual parts, namely a side part outer frame 4 and a reinforcement structure 11, which is fixed within the side part outer frame 4, but is shown separately in FIG. 1 to be visible. While a side part outer skin 10, as it is shown in FIG. 3, according to the prior art, merely has a material thickness for a hot-formable sheet of 750 μm, this side part outer frame 4 according to the invention is produced of a approximately 1.3 mm thick sheet as a stable and one-piece construction.

A hot pressing-punching method is therefore sufficient to produce the entire side part outer frame 4 with the rear fender region 9, the roof frame region 13, the floor sill 14, the door openings 15 and 16 as well as the two pillars 5 and 6 between roof frame region 13 and floor sill 14 for a front and for a rear door. From the same material of the same material thickness it is then possible to punch and mold the reinforcement structure 11 which reinforces the center pillar 6 within the side part outer frame 4 where it is fitted in for example by means of spot welding or gluing and/or adhesive soldering. Instead of this reinforcement structure 11 the next figure shows a side structure 2 with reinforcement structures 21 and 12 of a plastic fiber, which in their outer contour are adapted to the front pillar 5 and/or the center pillar 6.

Figure 2:
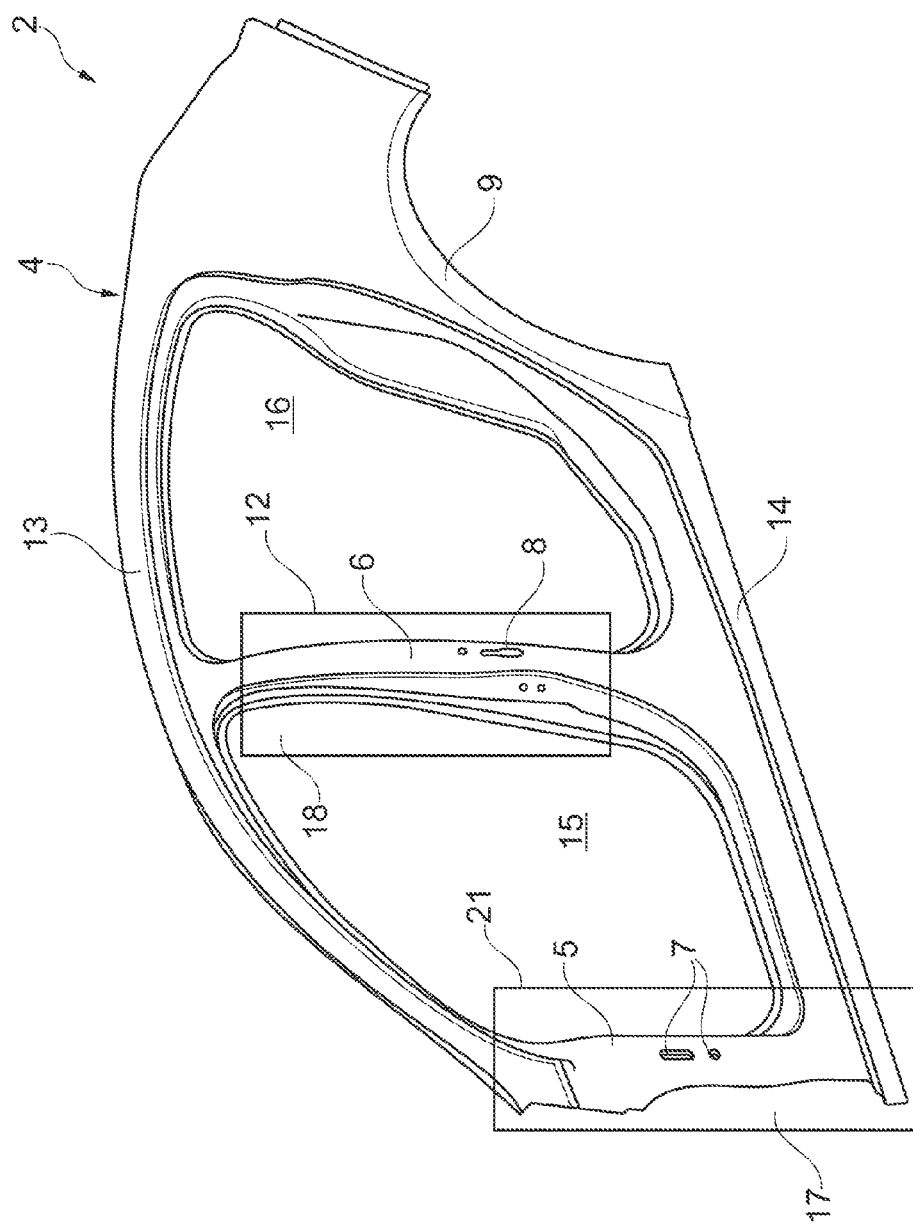
FIG. 2 shows a schematic representation of a side structure of a vehicle according to a second embodiment of the invention.

FIG. 2 shows a schematic representation of a side structure 2 of a vehicle according to a second embodiment of the invention. Components with identical function as in FIG. 1 are marked with the same reference numbers and are not discussed separately.

This FIG. 2 emphasizes the two regions 17 and 18 in which is located the front pillar 5 with its mounting connections 7 for a front door and the center pillar 6 with the mounting connections 8 for a rear door. Despite the stable and relatively safe construction of a one-piece side part outer frame 4 with greater material thickness a reinforcement structure that is not shown is provided in the regions 17 and 18, which is fixed on the invisible inner side of the side part outer frame 4. These reinforcement structures comprise a fiber-reinforced plastic wherein the reinforcement structures of fiber composite material comprise a plastic compound with a filling degree of approximately 40% by volume to approximately 90% by volume of fiber material, preferentially approximately 70% by volume to approximately 80% by volume of fiber material as fiber composite material and are glued into the center console or the front console so that these are not visible in the outer side of the side part outer frame shown here.

The advantage of these plastic reinforcement structures is that they constitute a further weight gain for the side structure 2. Comparing the total weight of the side structure according to the prior art shown in FIG. 3 with the total weight of the side structure according to FIG. 1, weight saving of almost 20 g could be achieved without losing in terms of crash safety of this side structure 4. Since in addition the quantity of parts to be mounted and produced as well as stored is reduced in FIG. 1 to two parts and in FIG. 2 to a maximum of three parts, there is a significant cost saving if the thin side part outer skin customary to date is omitted and instead of the plurality of safety structure elements a side part outer frame according to an embodiment off the invention with approximately 30% to approximately 50% greater material thickness than the side part outer skin is employed.

FIG. 3 shows a schematic representation of a side structure 3 of a vehicle according to the prior art as was already explained at the outset.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A side structure of a, comprising:
a frame including a front pillar and a center pillar;
a plurality of mounting connections for a plurality of door hinges arranged on the front pillar and the center pillar;
a first reinforcement structure having a contour adapted to be affixed to the inner surface of the front pillar; and
a second reinforcement structure having a contour adapted to be affixed to the inner surface of the center pillar;
wherein the frame extends from a windshield region to a rear fender region and is a single piece having a thickness of approximately 1.3 millimeters;
wherein said first and second reinforcement structures comprise a fiber composite material comprising a plastic compound with a filling degree of approximately 40% by volume to approximately 90% by volume of fiber material; and wherein the first and second reinforcement structures have a thickness of about 1.3 millimeters.

2. The side structure according to claim 1, wherein the front pillar and the center pillar and the rear fender region are arranged between a roof frame region and a floor sill of the frame.

3. The side structure according to claim 1, wherein the frame material is at least one third thicker than a conventional side part outer skin.

4. The side structure according to claim 1, wherein a first total weight of the frame with said first and second reinforcement structures is less than a second total weight of a conventional side structure with a plurality of locally reinforcing safety structure elements.

5. The side structure according to claim 1, wherein said first and second reinforcement structures comprise the plastic compound with the filling degree of approximately 70% by volume to approximately 80% by volume of the fiber material as the fiber composite material.

6. The side structure according to claim 1, wherein the fiber composite material of the first and second reinforcement structures comprise a plurality of glass fibers.

7. The side structure according to claim 1, wherein the fiber composite material of the first and second reinforcement structures comprise a plurality of carbon fibers.

8. The side structure according to claim 1, wherein the frame comprises a sheet of an aluminum alloy.

9. The side structure according to claim 7, wherein the first and second reinforcement structures comprise an aluminum die casting alloy.

* * * * *